(12) United States Patent
Jeong et al.

(10) Patent No.: US 10,122,927 B2
(45) Date of Patent: Nov. 6, 2018

(54) DYNAMIC PREVIEW DISPLAY METHOD OF ELECTRONIC DEVICE AND ELECTRONIC DEVICE THEREOF

(71) Applicant: Samsung Electronics Co., Ltd., Gyeonggi-do (KR)

(72) Inventors: Sooman Jeong, Seoul (KR); Woohyun Baek, Gyeonggi-do (KR); Min-Keun Cho, Gyeonggi-do (KR); Seung-Won Han, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 65 days.

(21) Appl. No.: 15/186,668

(22) Filed: Jun. 20, 2016

(65) Prior Publication Data

US 2017/0006230 A1    Jan. 5, 2017

(30) Foreign Application Priority Data

Jul. 3, 2015   (KR) .................. 10-2015-0095454

(51) Int. Cl.
*H04N 5/232* (2006.01)
*H04N 5/04* (2006.01)
*H04N 7/01* (2006.01)
*H04N 5/76* (2006.01)

(52) U.S. Cl.
CPC ......... *H04N 5/23293* (2013.01); *H04N 5/04* (2013.01); *H04N 7/013* (2013.01); *H04N 5/76* (2013.01)

(58) Field of Classification Search
CPC .................................. H04N 5/23293
USPC .................................. 348/333.01
See application file for complete search history.

(56) References Cited

U.S. PATENT DOCUMENTS

| 7,710,468 | B2 * | 5/2010 | Uchida | H04N 5/23293 |
| | | | | 348/222.1 |
| 9,055,270 | B2 * | 6/2015 | Takemoto | H04N 5/772 |
| 2008/0151070 | A1 * | 6/2008 | Shiozawa | H04N 5/23293 |
| | | | | 348/222.1 |
| 2012/0105679 | A1 * | 5/2012 | Osuga | H04N 5/23238 |
| | | | | 348/231.99 |
| 2015/0235343 | A1 * | 8/2015 | Asai | G06T 1/60 |
| | | | | 345/534 |
| 2017/0118434 | A1 * | 4/2017 | Shiohara | H04N 5/3765 |
| 2017/0163898 | A1 * | 6/2017 | Shiohara | H04N 5/23293 |

FOREIGN PATENT DOCUMENTS

KR    10-2013-0121458 A    11/2013

* cited by examiner

*Primary Examiner* — Anthony J Daniels
(74) *Attorney, Agent, or Firm* — Cha & Reiter, LLC

(57) ABSTRACT

A method for use in an electronic device, comprising: acquiring an image frame from an image sensor; adjusting an output timing of the image frame based on a vertical synchronization signal of a display; and displaying the image frame on the display in accordance with the output timing.

18 Claims, 10 Drawing Sheets ent filed in the Korean Intellectual Property Office on Jul. 3, 2015 and assigned Serial No. 10-2015-0095454, the entire disclosure of which are herein incorporated by reference.

DYNAMIC PREVIEW DISPLAY METHOD OF ELECTRONIC DEVICE AND ELECTRONIC DEVICE THEREOF

CLAIM OF PRIORITY

This application claims priority under 35 U.S.C. § 119(a) to a Korean Patent Application filed in the Korean Intellectual Property Office on Jul. 3, 2015 and assigned Serial No. 10-2015-0095454, the entire disclosure of which are herein incorporated by reference.

BACKGROUND

1. Field of the Invention

Various embodiments of the present disclosure relate to a dynamic preview display method of an electronic device and the electronic device thereof.

2. Description of the Related Art

Recently, with the growth of digital technologies, various types of electronic devices are being widely used such as mobile communication terminals, smart phones, tablet Personal Computers (PCs), Personal Digital Assistants (PDAs), electronic organizers, notebook computers, wearable devices, or the like. The electronic devices are coming to a mobile convergence level encompassing even functions of other devices.

The electronic devices may, for example, provide a calling function such as a voice call and a video call, a message function such as a Short Message Service (SMS)/Multimedia Message Service (MMS), an electronic mail (e-mail), and the like, an electronic organizer function, a camera function, a broadcast play function, a video play function, a music play function, an Internet function, a messenger function, a game function, a Social Networking Service (SNS) function, or the like.

The electronic devices (for example, various types of electronic devices such as smart phones, digital cameras, or the like) may display images stored within the electronic devices on screens or display previews of images photographed by image sensors on the screens.

SUMMARY

According to aspects of the disclosure, a method for use in an electronic device is provided, comprising: acquiring an image frame from an image sensor; adjusting an output timing of the image frame based on a vertical synchronization signal of a display; and displaying the image frame on the display in accordance with the output timing.

According to aspects of the disclosure, an electronic device is provided comprising: a memory; an image sensor; a display; and at least one processor operatively coupled to the memory, configured to: acquire an image frame from the image sensor; adjust an output timing of the image frame based on a vertical synchronization signal of the display; and display the image frame on the display in accordance with the output timing.

According to aspects of the disclosure, a non-transitory computer readable medium is provided that stores one or more processor-executable instructions, which when executed by at least one processor, cause the at least one processor to perform a process comprising the steps of: acquiring an image frame from an image sensor; adjusting an output timing of the image frame based on a vertical synchronization signal of a display; and displaying the image frame on the display in accordance with the output timing.

BRIEF DESCRIPTION OF THE DRAWINGS

The above and other objects, features and advantages of the present disclosure will become more apparent from the following detailed description when taken in conjunction with the accompanying drawings in which.

DETAILED DESCRIPTION

Figure 1:
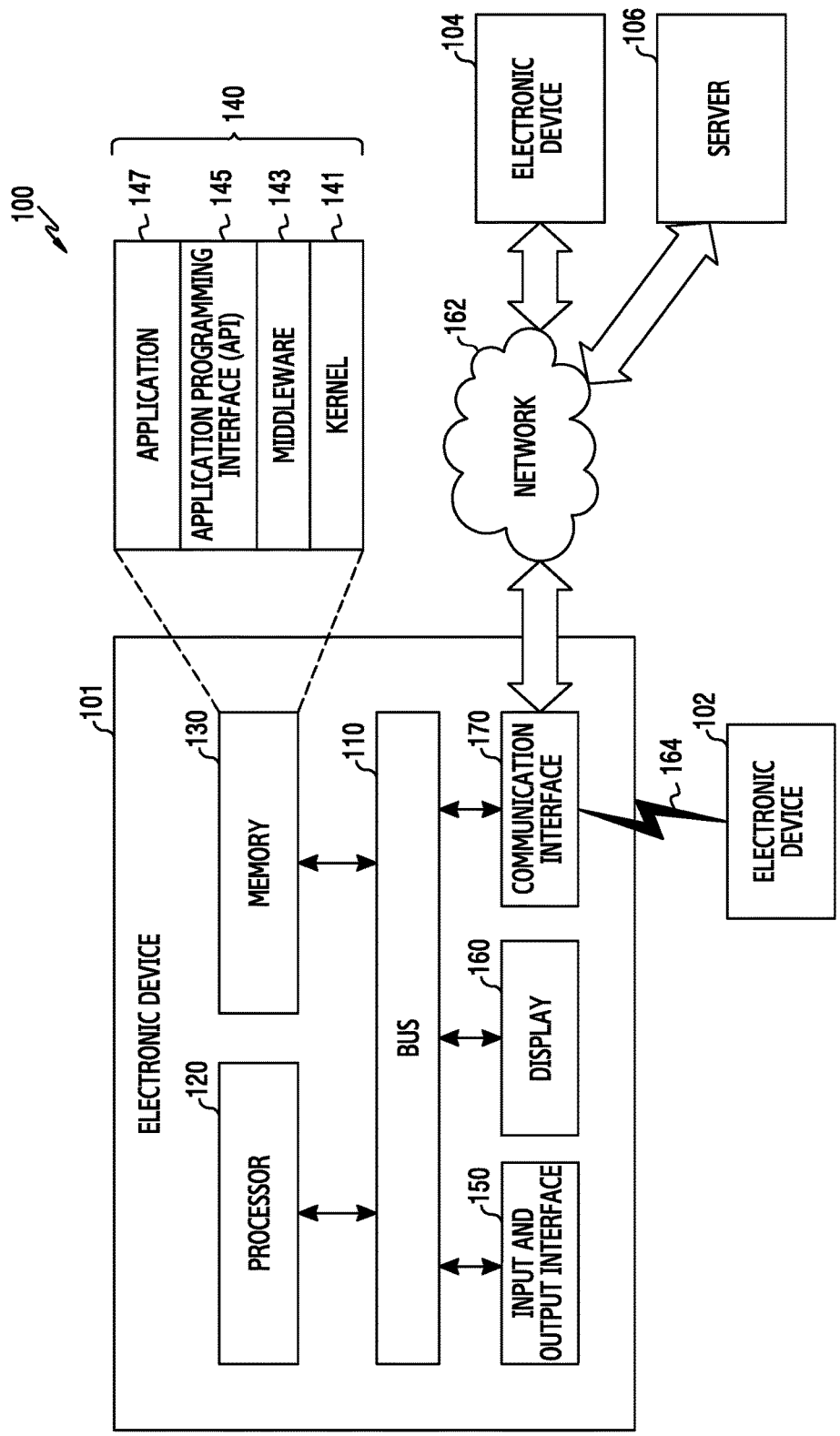
FIG. 1 is a diagram of an example of an example of a network environment, according to various embodiments of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . ." may mean that the apparatus is "capable of . . ." along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; a power bank; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In other embodiments, an electronic device may comprise at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global navigation satellite system (GNSS); an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like).

In certain embodiments, an electronic device may comprise at least one of: a piece of furniture or a building/structure; an electronic board; an electronic signature receiving device; a projector; and various measuring instruments (e.g., a water meter, an electricity meter, a gas meter, or a wave meter). Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

FIG. 1 is a diagram of an example of an example of a network environment, according to various embodiments of the present disclosure.

Referring to FIG. 1, the electronic device 101 in the network environment 100, according to the various embodiments, will be described below with reference to FIG. 1. The electronic device 101 may comprise a bus 110, a processor 120, a memory 130, an input/output interface 150, a display 160, and a communication interface 170. In an embodiment, at least one of the elements of the electronic device 101 may be omitted, or other elements may be additionally included in the electronic device 101.

The bus 110 may include, for example, a circuit that interconnects the elements 110 to 170 and transfers communication (e.g., a control message and/or data) between the elements.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. Additionally or alternatively, the processor 120 may include one or more of a central processing unit (CPU), an application processor (AP), and a communication processor (CP). The processor 120 may, for example, perform an operation or data processing on control and/or communication of at least one other element of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. In operation, the memory 130 may store, for example, instructions or data (e.g. motion pattern information and motion data) relevant to at least one other element of the electronic device 101. According to an embodiment, the memory 130 may store software and/or a program 140. For example, the program may include a kernel 141, middleware 143, an application programming interface (API) 145, and an application (or application program) 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143, for example, may function as an intermediary for allowing the API 145 or the application 147 to communicate with the kernel 141 to exchange data.

In addition, the middleware 143 may process one or more task requests received from the application 147 according to priorities thereof. For example, the middleware 143 may assign priorities for using the system resources (e.g., the bus 110, the processor 120, the memory 130, or the like) of the electronic device 101, to at least one of the application 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160, for example, may display various types of content (e.g., text, images, videos, icons, or symbols) to the user. The display 160 may include a touch screen and receive, for example, a touch, gesture, proximity, or hovering input using an electronic pen or a body part of a user.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may be performed by using at least one of, for example, Wi-Fi, Bluetooth, Near Field Communication (NFC), and Global Navigation Satellite System (GNSS). The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system). Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard-232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic device 102 and the electronic device 104 or the server 106). According to an embodiment, when the electronic device 101 has to perform some functions or services automatically or in response to a request, the electronic device 101 may make a request for performing at least some functions relating thereto to another device (e.g., the electronic device 102 or the electronic device 104 or the server 106) instead of performing the functions or services by itself or in addition. Another electronic device (e.g., the electronic device 102 or the electronic device 104 or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
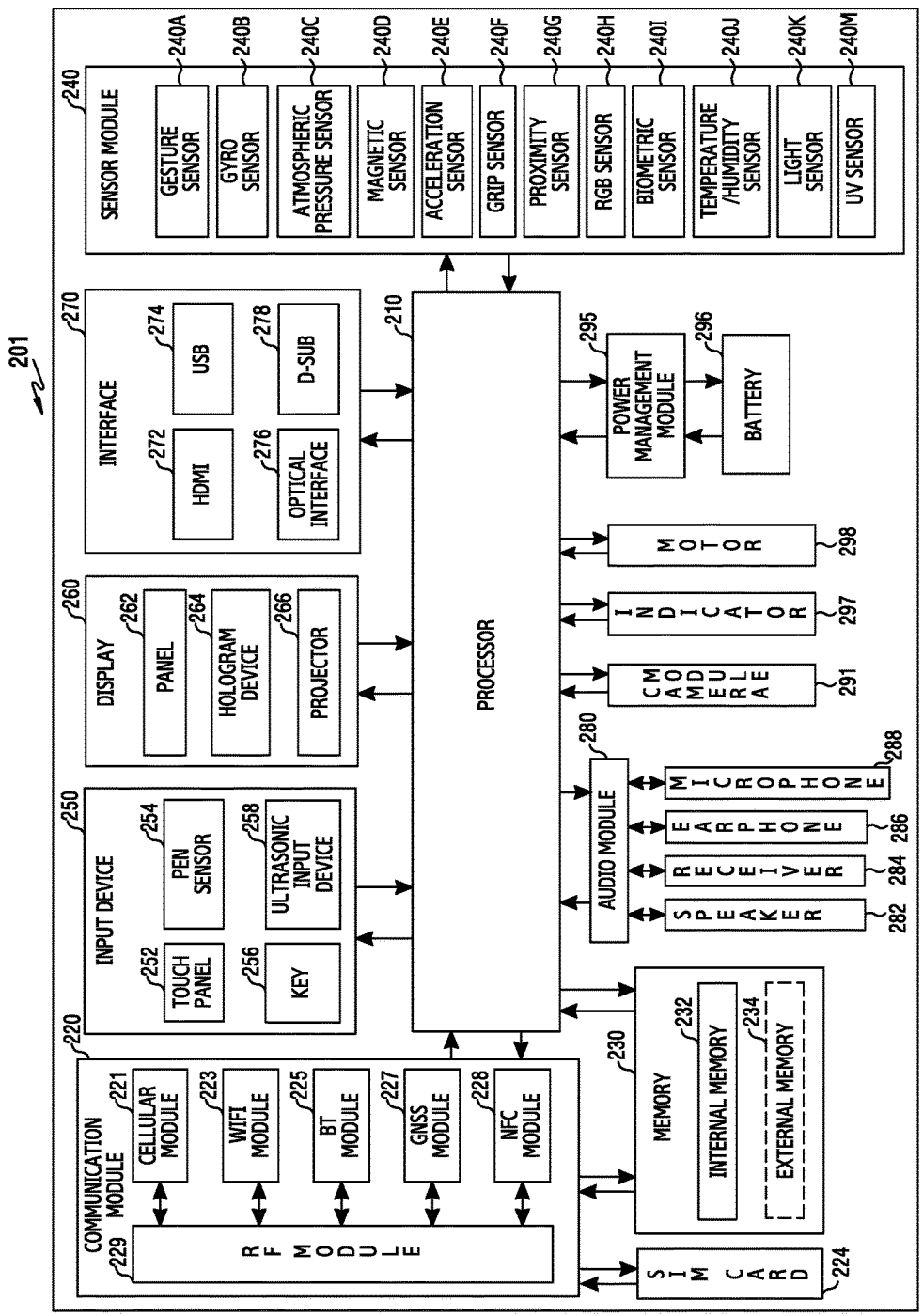
FIG. 2 is a block diagram of an example of an electronic device, according to various embodiments of the present disclosure.

FIG. 2 is a block diagram of an example of an electronic device, according to various embodiments of the present disclosure.

Referring to FIG. 2, the electronic device 201 may comprise, for example, all or a part of the electronic device 101 illustrated in FIG. 1. The electronic device 201 may comprise at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may, for example, control a plurality of hardware or software elements connected thereto and perform a variety of data processing and calculations by driving an operating system or application programs. The AP 210 may be implemented as, for example, a system on chip (SoC). According to an embodiment, the AP 210 may further include a graphic processing unit (GPU) and/or an image signal processor. The AP 210 may include at least some of the elements (e.g., a cellular module 221) illustrated in FIG. 2. The AP 210 may load commands or data, received from at least one other element (e.g., a non-volatile memory), in a volatile memory to process the loaded commands or data, and may store various types of data in the non-volatile memory.

The communication module 220 may have a configuration that is the same as or similar to that of the communication interface 160 of FIG. 1. The communication module 220 may include, for example, a cellular module 221, a Wi-Fi module 223, a BT module 225, a GPS module 227, an NFC module 228, and a radio frequency (RF) module 229. The communication module 220 provides a function of transmitting/receiving a signal. Accordingly, the communication module 220 may be referred to as a "reception unit", a "transmission unit", a "transmission and reception unit", a "communication unit", or the like.

The cellular module 221 may provide, for example, a voice call, a video call, a text message service, or an Internet service through a communication network. According to an embodiment, the cellular module 221 may distinguish and authenticate the electronic device 201 in the communication network by using a subscriber identification module (e.g., the SIM card 224). According to an embodiment, the cellular module 221 may perform at least some of the functions that the AP 210 may provide. According to an embodiment, the cellular module 221 may include a communication processor (CP).

The Wi-Fi module 223, the BT module 225, the GPS module 227, or the NFC module 228 may include, for example, a processor for processing data transmitted/received through the corresponding module. According to an embodiment, at least some (e.g., two or more) of the cellular module 221, the Wi-Fi module 223, the BT module 225, the GPS module 227, and the NFC module 228 may be included in a single integrated chip (IC) or IC package.

The RF module 229 may, for example, transmit/receive a communication signal (e.g., an RF signal). The RF module 229 may include, for example, a transceiver, a power amp module (PAM), a frequency filter, a low noise amplifier (LNA), or an antenna. According to another embodiment, at least one of the cellular module 221, the Wi-Fi module 223, the BT module 225, the GPS module 227, and the NFC module 228 may transmit/receive an RF signal through a separate RF module.

The SIM card 224 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

The memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a bio-sensor 240I, a temperature/humidity sensor 240J, an illumination sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment, the electronic device 201 may further comprise a processor that is configured as a part of the AP 210 or a separate element from the AP 210 in order to control the sensor module 240, thereby controlling the sensor module 240 while the AP 2710 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. In addition, the touch panel 252 may further include a control circuit. The touch panel 252 may further include a tactile layer to provide a tactile reaction to a user.

The (digital) pen sensor 254 may be, for example, a part of the touch panel, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may, for example, convert a sound into an electrical signal, and vice versa. At least some elements of the audio module 280 may be included in, for example, the input/output interface 140 illustrated in FIG. 1. The audio module 280 may, for example, process sound information that is input or output through the speaker 282, the receiver 284, the earphones 286, the microphone 288, or the like.

The camera module 291 may be, for example, a device that may take a still image or a moving image, and according to an embodiment, the camera module 291 may include one or more image sensors (e.g., a front sensor or a rear sensor), a lens, an image signal processor (ISP), or a flash (e.g., an LED or a xenon lamp).

The power management module 295 may, for example, manage power of the electronic device 201. According to an embodiment, the power management module 295 may include a Power Management Integrated Circuit (PMIC), a charger IC, or a battery or fuel gauge. The PMIC may use a wired and/or wireless charging method. Examples of the wireless charging method may include, for example, a magnetic resonance scheme, a magnetic induction scheme, an electromagnetic wave scheme, and the like. Further, the power management module 295 may further include additional circuits (e.g., a coil loop, a resonance circuit, a rectifier, and the like) for wireless charging. The battery gauge may measure, for example, a residual quantity of the battery 296, and a voltage, a current, or a temperature during the charging. The battery 296 may include, for example, a rechargeable battery and/or a solar battery.

The indicator 297 may indicate a specific state of the electronic device 201 or a part thereof (e.g., the AP 210), for example, a booting state, a message state, a charging state, or the like. The motor 298 may convert an electrical signal into a mechanical vibration, and may generate a vibration effect or a haptic effect. Although not illustrated, the electronic device 201 may comprise a processing unit (e.g., a GPU) for mobile TV support. The processing device for mobile TV support may, for example, process media data according to a standard of digital multimedia broadcasting (DMB), digital video broadcasting (DVB), media flow, or the like.

Each of the components of the electronic device according to the present disclosure may be implemented by one or more components and the name of the corresponding component may vary depending on a type of the electronic device. In various embodiments, the electronic device may comprise at least one of the above-described elements. Some of the above-described elements may be omitted from the electronic device, or the electronic device may further comprise additional elements. Further, some of the elements of the electronic device according to various embodiments of the present disclosure may be coupled to form a single entity while performing the same functions as those of the corresponding elements before the coupling.

Figure 3:
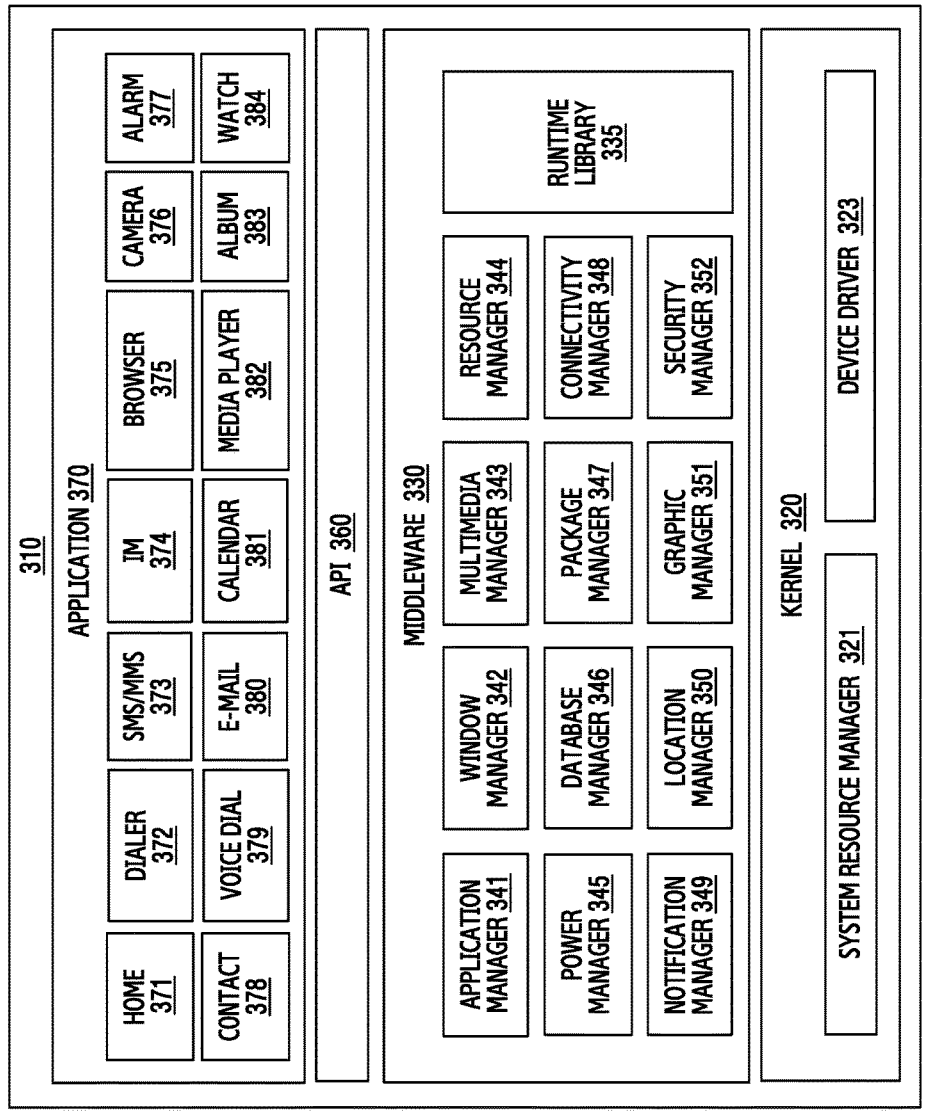
FIG. 3 is a block diagram of an example of a program module, according to various embodiments of the present disclosure.

FIG. 3 is a block diagram of an example of a program module, according to various embodiments of the present disclosure.

According to an embodiment, the program module 310 (e.g., the program 140) may include an operating system (OS) that controls resources relating to an electronic device (e.g., the electronic device 101) and/or various applications (e.g., the application 147) executed in the operating system. The operating system may be, for example, Android, iOS™, Windows™, Symbian™, Tizen™, Bada™, or the like.

The programming module 310 may include a kernel 320, middleware 330, an application programming interface (API) 360, and/or applications 370. At least some of the program module 310 may be preloaded in the electronic device, or may be downloaded from an external electronic device (e.g., the electronic device 102, the electronic device 104, and the server 106).

The kernel 320 (e.g., the kernel 141 of FIG. 1) may include, for example, a system resource manager 321 or a device driver 323. The system resource manager 321 may control, allocate, or collect system resources. According to an embodiment, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a Wi-Fi driver, an audio driver, or an inter-process communication (IPC) driver.

The middleware 330 may provide a function required by the applications 370 in common, or may provide various functions to the applications 370 through the API 360 to enable the applications 370 to efficiently use limited system resources in the electronic device. According to an embodiment, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier in order to add a new function through a programming language during the execution of the applications 370. The run time library 335 may perform input/output management, memory management, or a function for an arithmetic function.

The application manager 341 may manage, for example, a life cycle of at least one of the applications 370. The window manager 342 may manage GUI resources used by a screen. The multimedia manager 343 may identify a format required for reproducing various media files, and may encode or decode a media file using a codec suitable for the corresponding format. The resource manager 344 may manage resources of at least one of the applications 370, such as a source code, a memory, a storage space, and the like.

The power manager 345 may operate together with, for example, a basic input/output system (BIOS) to manage a battery or power and provide power information required for an operation of the electronic device. The database manager 346 may generate, search, or change a database to be used by at least one of the applications 370. The package manager 347 may manage installation or update of an application distributed in the format of a package file.

The connectivity manager 348 may manage, for example, a wireless connection, such as Wi-Fi or Bluetooth. The notification manager 349 may display or notify of an event, such as a received message, an appointment, and a proximity notification, in such a manner as not to disturb a user. The location manager 350 may manage location information of the electronic device. The graphic manager 351 may manage a graphic effect to be provided to a user, or a user interface related thereto. The security manager 352 may provide all security functions required for system security or user authentication. According to an embodiment, in cases where the electronic device (e.g., the electronic device 101) has a telephone call function, the middleware 330 may further include a telephony manager for managing a voice or video call function of the electronic device.

The middleware 330 may include a middleware module that forms combinations of various functions of the aforementioned elements. The middleware 330 may provide specialized modules according to the types of operating systems in order to provide differentiated functions. In addition, the middleware 330 may dynamically delete some of the existing elements, or may add new elements.

The API 360 (e.g., the API 145) may be, for example, a set of API programming functions, and may be provided with different configurations according to operating systems. For example, in the case of Android or iOS, one API set may be provided for each platform, and in the case of Tizen, two or more API sets may be provided for each platform.

The applications 370 (e.g., the application 147) may include, for example, one or more applications that may provide functions, such as home 371, dialer 372, SMS/MMS 373, instant message (IM) 374, browser 375, camera 376, alarm 377, contact 378, voice dialer 379, e-mail 380, calendar 381, media player 382, album 383, clock 384, health care (e.g., to measure exercise quantity or blood sugar), or environment information (e.g., atmospheric pressure, humidity, or temperature information).

According to an embodiment, the applications 370 may include an application (hereinafter, referred to as an "information exchange application" for convenience of the description) that supports information exchange between the electronic device (e.g., the electronic device 101) and external electronic devices (e.g., the electronic devices 102 and 104). The information exchange application may include, for example, a notification relay application for transmitting specific information to the external electronic device, or a device management application for managing the external electronic device.

For example, the notification relay application may include a function of transferring, to an external electronic device (e.g., the electronic device 102 or the electronic device 104), notification information generated from other applications of the electronic device (e.g., an SMS/MMS application, an e-mail application, a health management application, or an environmental information application). Furthermore, the notification relay application may, for example, receive notification information from an external electronic device and provide the received notification information to a user. The device management application may, for example, manage (e.g., install, delete, or update) at least one function of an external electronic device (e.g., the electronic device 104) communicating with the electronic device (for example, a function of turning on/off the external electronic device itself (or some elements thereof), or a function of adjusting luminance (or a resolution) of the display), applications operating in the external electronic device, or services provided by the external electronic device (e.g., a telephone call service or a message service).

According to an embodiment, the applications 370 may include an application (e.g., a health care application) specified according to attributes (e.g., attributes of the electronic device such as the type of an electronic device which corresponds to a mobile medical device of the external electronic device (e.g., the electronic device 102 or the electronic device 104). According to one embodiment, the applications 370 may include an application received from an external electronic device (e.g., the server 106 or the electronic device 102 or the electronic device 104). According to an embodiment, the applications 370 may include a preloaded application or a third party application that may be downloaded from a server. The names of the elements of the program module 310, according to the embodiment illustrated in the drawing, may vary according to the type of operating system.

According to various embodiments, at least a part of the programming module 310 may be implemented in software, firmware, hardware, or a combination of two or more thereof. At least some of the programming module 310 may be implemented (for example, executed) by, for example, the processor (for example, the AP 210). At least some of the programming module 310 may include, for example, a module, program, routine, sets of instructions, process, or the like for performing one or more functions.

The term "module" used in the present document, for example, may refer to a unit that includes one of hardware, software, or firmware, or a combination thereof. The "module," for example, may be interchangeably used with the terms, such as a unit, logic, a logical block, a component, or a circuit. The "modules" may be the minimum unit of a component, which is integrally formed, or a portion thereof. The "module" may be the minimum unit, which performs one or more functions, or a portion thereof. The "module" may be implemented mechanically or electronically. For example, the "module" may include at least one of an ASIC (application specific integrated circuit) chip, an FPGA (field-programmable gate array), or a programmable logic device, which is known or will be developed in the future, and which performs some operations.

At least some of the device (e.g., modules or functions) or the method (e.g., operations), according to various embodiments, for example, may be implement by instructions that are stored, in the form of a program module, in a computer-readable storage medium. One or more processors may perform the function corresponding to the instruction when the instruction is executed by the processor (e.g., the processor 120). The computer-readable storage medium, for example, may be the memory 130.

The computer-readable recording medium may include a hard disk, a floppy disk, a magnetic medium (e.g., a magnetic tape), an optical medium (e.g., a CD-ROM (compact disc read only memory), a DVD (digital versatile disc), or a magneto-optical medium (e.g., a floptical disk)), hardware devices (e.g., a read only memory (ROM), a random access memory (RAM), or a flash memory, or the like). In addition, the program instruction may include a machine language code that is produced by a compiler, as well as a high-level language code that may be executed by the computer by using an interpreter. The above-described hardware device may be configured to operate as one or more software modules in order to perform the operations of various embodiments, and vice versa.

The module or the program module, according to various embodiments, may: include one or more elements described above; exclude some of them; or further include other elements. The operations performed by the module, the program module, or other elements, according to various embodiments, may be executed in a sequential, parallel, iterative, or heuristic method. In addition, some operations may be executed in a different order, or may be omitted, or other operations may be added. In addition, the embodiments disclosed in the present document are intended for the explanation and understanding of the technical matter, and shall not limit the scope of the technology described in the present document. Accordingly, the scope of the present disclosure should be construed to encompass all modifications or various other embodiments based on the technical concept of the present disclosure.

In addition, the embodiments disclosed in the present document are intended for the explanation and understanding of the disclosed technical matter, and shall not limit the scope of various embodiments of the present document. Therefore, the scope of various embodiments of the present document should be construed to encompass all modifications or various other embodiments based on the technical concept of the various embodiments of the present disclosure.

Figure 4:
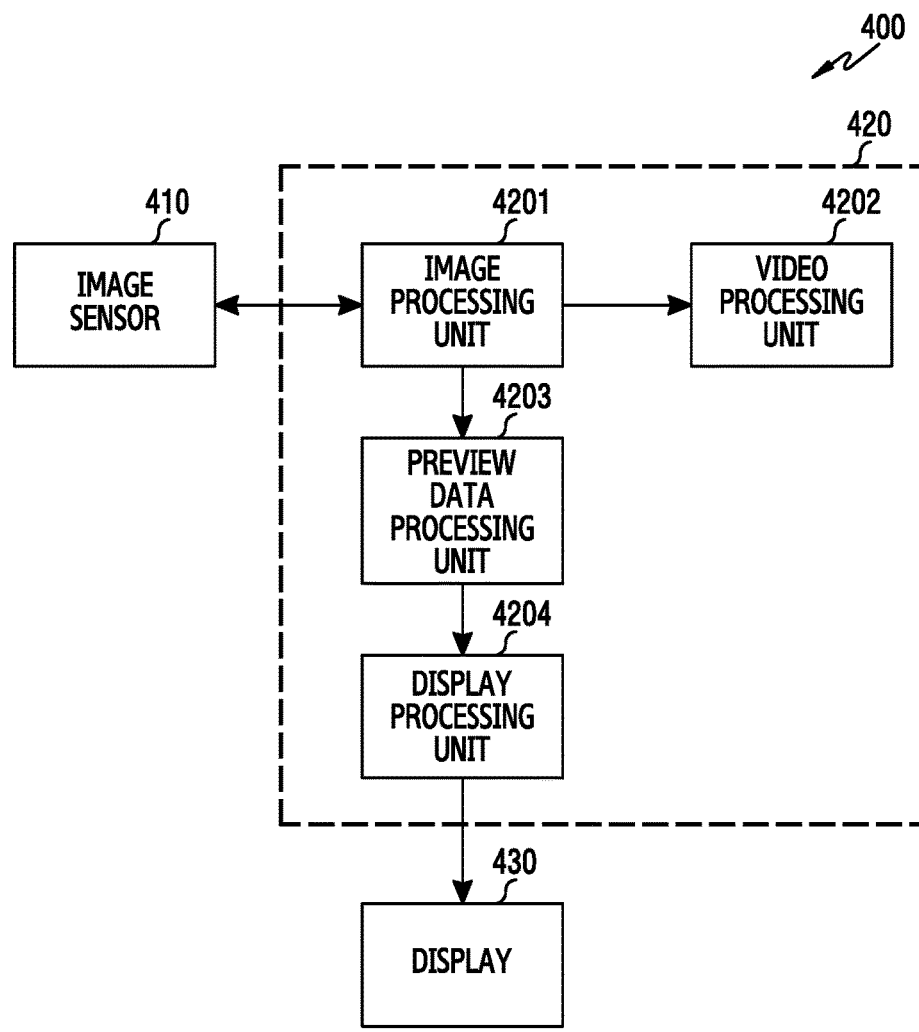
FIG. 4 is a block diagram of an example of an electronic device, according to various embodiments of the present disclosure.

FIG. 4 is a block diagram of an example of an electronic device, according to various embodiments of the present disclosure. As illustrated in FIG. 4, the electronic device 400 may include an image sensor 410, an application processor (or processor) 420, and a display 430. The electronic device 400 may include the entire or part of the electronic device 101 illustrated in FIG. 1. The application processor 420 may, for example, include an image processing unit 4201, a video processing unit 4202, a preview data processing unit 4203, a display processing unit 4204, and the like.

According to aspects of the disclosure, any of the elements 4201 to 4204 may be implemented in hardware, software, and/or a combination of hardware and software. The application processor 420 may support, though not limited to the preview mode mentioned above, for example. When the electronic device 400 is in the preview mode, the image processing unit 4201 may perform an image processing operation on a video frame acquired by the image sensor 410.

Here, when a current operation mode of the electronic device 400 is a video recording operation mode in which a video frame is recorded on a recording media, the image processing unit 4201 may output the image-data processed video frame to the video processing unit 4202 to record the image-data processed video frame on the recording media, while outputting the image-data processed video frame to the preview data processing unit 4203.

In contrast, when the current operation mode of the electronic device 400 is not the video recording operation mode, the image processing unit 4201 may output the image-data processed video frame only to the preview data processing unit 4203, without outputting the image-data processed video frame to the video processing unit 4202.

The preview data processing unit 4203 may receive the image-data processed video frame, and perform preview data processing of adding various supplementary information (e.g., a frame ID, a time stamp, and the like), and then output the preview-data processed video frame to the display processing unit 4204.

The display processing unit 4204 may receive the preview-data processed video frame, and perform display data processing by overlaying the video frame with additional other images, and then output the display-data processed video frame to the display 430. The display 430 may display the received video frame on a screen, based on a vertical synchronization signal (Vsync) of the display 430.

However, a general preview display method may cause a phenomenon of dropping of the video frame on the display 430, because the output timing of the video frame outputted from the application processor 420 to the display 430 is not synchronized with the vertical synchronization signal of the display 430 as mentioned earlier.

For example, the general preview display method may cause a drop phenomenon in which at least a partial video frame is not displayed on the display 430, because synchronization is not matched between the output timing of the video frame outputted from the application processor 420 to the display 430 and the vertical synchronization signal that is a display timing for displaying the video frame on the display 430.

Figure 5:
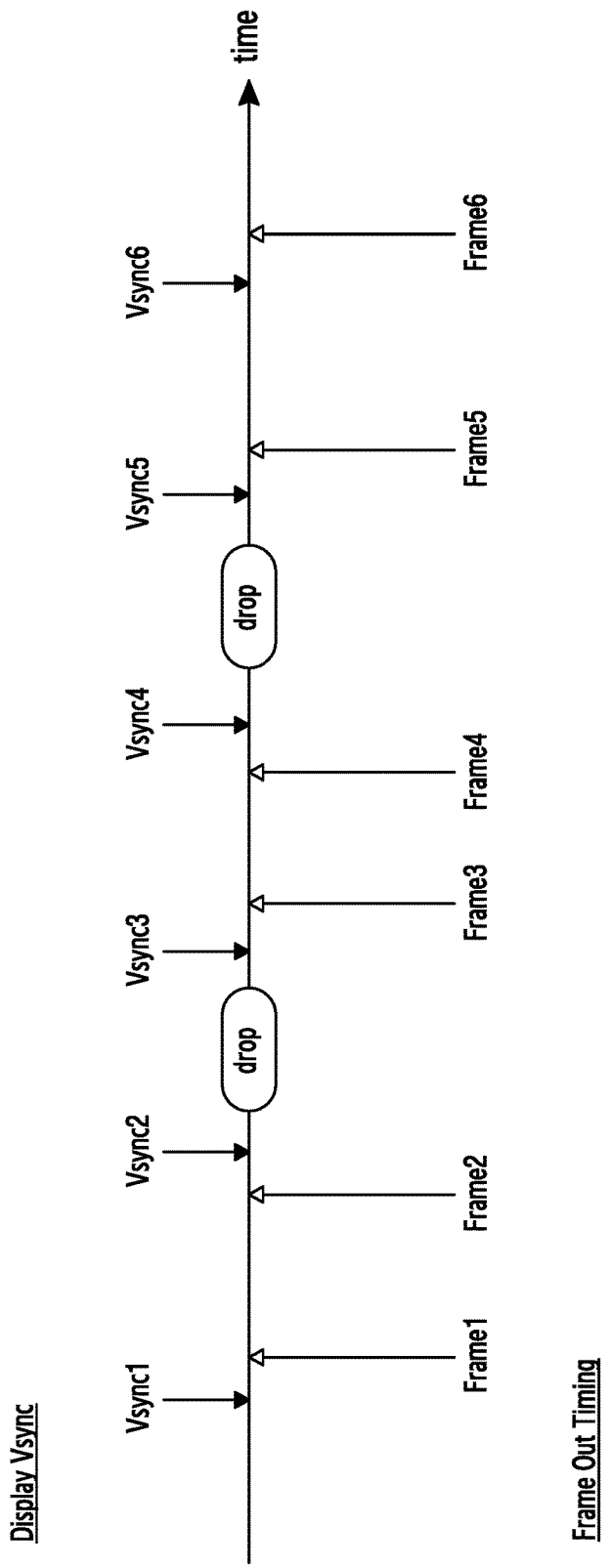
FIG. 5 is a timing diagram illustrating a technique for the display of image frames, according to various embodiments of the present disclosure.

FIG. 5 is a timing diagram illustrating a technique for the display of image frames, according to various embodiments of the present disclosure. As illustrated in FIG. 5, when the output timing of a second video frame (Frame 2) outputted from the application processor 420 to the display 430 is before a second vertical synchronization signal (Vsync2) of the display 430, it may cause a drop phenomenon in which the second video frame (Frame 2) is not displayed, in the period between the second vertical synchronization signal (Vsync2) and a third vertical synchronization signal (Vsync3).

Also, when the output timing of a fourth video frame (Frame 4) outputted from the application processor 420 to the display 430 is before a fourth vertical synchronization signal (Vsync4) of the display 430, it may cause a drop phenomenon in which the fourth video frame (Frame 4) is not displayed in the period between the fourth vertical synchronization signal (Vsync4) and a fifth vertical synchronization signal (Vsync5).

Figure 6:
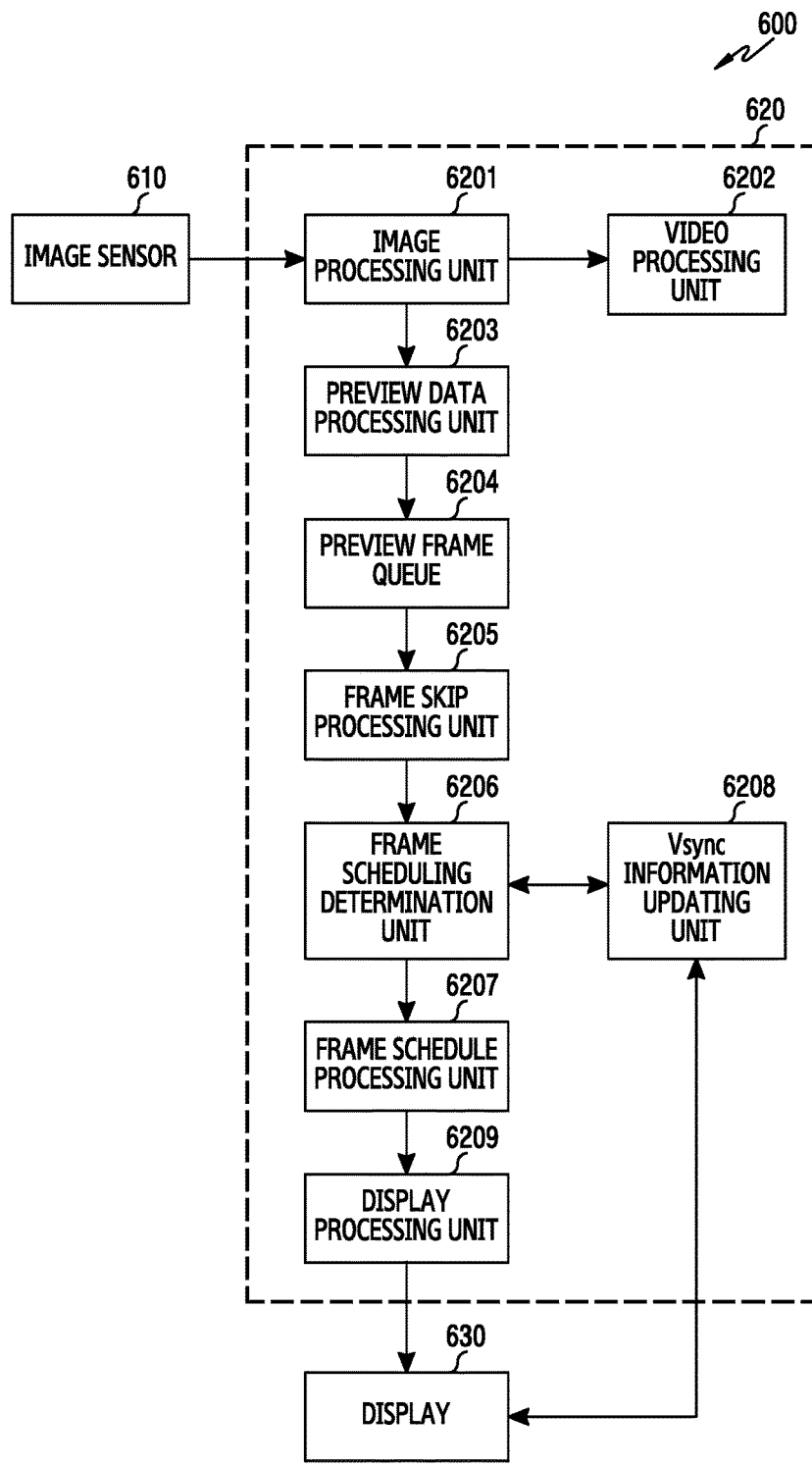
FIG. 6 is a diagram of an example of an electronic device, according to various embodiments of the present disclosure is applied.

FIG. 6 is a diagram of an example of an electronic device 600, according to various embodiments of the present disclosure is applied. As illustrated in FIG. 6, the electronic device 600 may, for example, comprise an image sensor 610, an application processor (or processor) 620, a display 630, and the like. The electronic device 600 may include the entire or part of the electronic device 101 illustrated in FIG. 1. The application processor 620 may, for example, include an image processing unit 6201, a video processing unit 6202, a preview data processing unit 6203, a preview frame queue 6204, a frame skip processing unit 6205, a frame scheduling determination unit 6206, a frame schedule processing unit 6207, a vertical synchronization information updating unit 6208, a display processing unit 6209, and the like.

According to aspects of the disclosure, any of the elements 6201-6209 included in the application processor 620 may be implemented in hardware, software, and/or any combination of hardware and software.

The application processor 620 may support, though not limited to, a preview mode. According to aspects of the disclosure, the preview mode may also be referred to as dynamic preview mode.

When the electronic device is in the dynamic preview mode, the image processing unit 6201 may perform an image processing operation on a video frame acquired by the image sensor 610. For example, when an operation mode of the electronic device 600 is a video recording operation mode in which a video frame is recorded on a recording media, the image processing unit 6201 may output the image-data processed video frame to the video processing unit 6202 to record the image-data processed video frame on the recording media, while outputting the image-data processed video frame to the preview data processing unit 6203.

Also, for example, when a current operation mode of the electronic device 600 is not the video recording operation mode, the image processing unit 6201 may only output the image-data processed video frame to the preview data processing unit 6203, without outputting the image-data processed video frame to the video processing unit 6202.

The preview data processing unit 6203 may receive the image-data processed video frame, and perform preview data processing by adding one or more additional types of supplementary information to the image-data processed video frame (e.g., a frame ID, a time stamp, and the like), and then output the preview-data processed video frame to the preview frame queue 6204.

The preview frame queue 6204 may, for example, be a frame buffer memory, for temporarily storing the preview-data processed video frame, and may, for example, temporarily store a plurality of video frames.

The frame skip processing unit 6205 may, for example, determine whether to sequentially output, to the frame scheduling determination unit 6206, the video frames temporarily stored in the preview frame queue 6204 or whether to delete at least one of the temporarily stored video frames.

For example, because a frame rate of a vertical synchronization signal of the display 630 is commonly lower than a frame rate of a video frame outputted from the image sensor 610, when the output timing of the video frame is adjusted (e.g., delayed) based on the vertical synchronization signal, the video frames temporarily stored in the preview frame queue 6204 may be increased and accumulated in number after the lapse of a predetermined time period. Therefore, the preview skip processing unit 6205 may delete one or more of the video frames stored in the preview frame queue 6204.

By deleting a part of the video frames accumulated in the preview frame queue 6204, the preview skip processing unit 6205 may prevent the occurrence of a display latency phenomenon in which a video frame which is recorded in real time by the image sensor 610 is displayed on the display 630 after an excessive delay period (e.g., two seconds or more).

The vertical synchronization information updating unit 6208 may, for example, acquire information associated with a vertical synchronization signal from the display 630. According to one embodiment, the vertical synchronization information updating unit 6208 may update the information associated with the vertical synchronization signal of the display 630, and output the updated information to the frame scheduling determination unit 6206. For example, the vertical synchronization information updating unit 6208 may monitor the vertical synchronization signal of the display 630, and output timing or interval information of each vertical synchronization signal to the frame scheduling determination unit 6206.

The frame scheduling determination unit 6206 may, for example, determine the output timing of a video frame that will be transmitted to the display 630, based on at least one of the timing or interval information associated with the vertical synchronization signal. The frame schedule processing unit 6207 may, for example, adjust (e.g., delay) the output timing of the video frame that will be transmitted to the display 630, based on the determined output timing. According to one embodiment, the frame scheduling determination unit 6206 and the frame schedule processing unit 6207 may be integrated into one constituent element.

The display processing unit 6209 may receive the video frame of which the output timing has been adjusted, and output the received video frame to the display 630. According to one embodiment, the display processing unit 6209 may overlay the video frame of which the output timing has been adjusted with another image, and output the overlaying result to the display 630. The display 630 may display, on a screen, the received video frame based on the vertical synchronization signal.

Accordingly, the dynamic preview display method of the present disclosure may prevent image frames (e.g., video frames) from being dropped by dynamically adjusting the output timing of the video frame outputted from the application processor 620 to the display 630 based on a vertical synchronization signal of the display 630.

Figure 7:
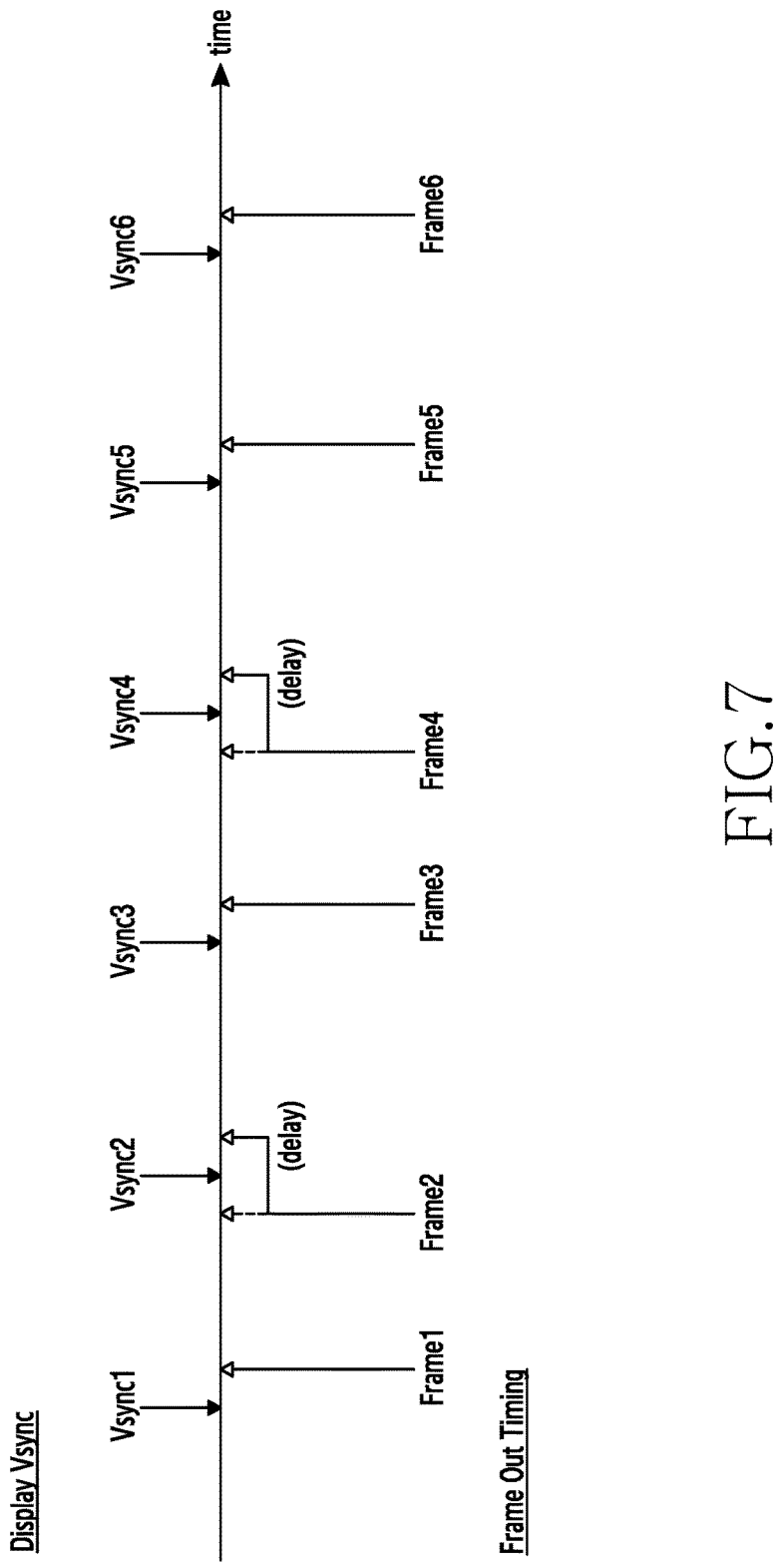
FIG. 7 is a timing diagram illustrating a technique for the display of image frames, according to various embodiments of the present disclosure.

FIG. 7 is a timing diagram illustrating a technique for the display of image frames, according to various embodiments of the present disclosure. As illustrated in FIG. 7, the application processor 620 may adjust the output timing of a second video frame (Frame2) outputted to the display 630, so that the output timing of the second video frame may can be delayed by a predetermined time period (e.g., 1 millisecond (ms)) after a second vertical synchronization signal (Vsync2) is generated. Accordingly, the second video frame may be displayed on the display 630 in the period between the second vertical synchronization signal and a third vertical synchronization signal (Vsync3) or at the time instant when the third vertical synchronization signal is generated.

Also, the application processor 620 may adjust (e.g., delay) the output timing of a fourth video frame (Frame4) outputted to the display 630, so that the output timing of the fourth video frame can be delayed by a predetermined time period (e.g., 1 ms) after a fourth vertical synchronization signal (Vsync4) is generated. Accordingly, the fourth video frame may be displayed on the display 630 in the period between the fourth vertical synchronization signal and a fifth vertical synchronization signal (Vsync5) or at the time instant when the fifth vertical synchronization signal is generated.

The dynamic preview display method according to various embodiments of the present disclosure may be carried out in response to a frame rate of a video displayed on a display being a specified frame rate. According to one embodiment, when a frame rate used for preview is equal to or is greater than a specified value, the electronic device 600 may output the timing of a video frame received from the image sensor 610 in accordance with a vertical synchronization signal of the display 630. When the frame rate used for preview is lower than or equal to the specified value, the electronic device 600 may output, to the display 630, the timing of the video frame received from the image sensor 610 irrespective of the vertical synchronization signal of the display 630.

For example, the electronic device 600 may perform a method according to an embodiment of the present disclosure, only in a video recording operation mode or virtualreality operation mode of displaying a video frame at sixty frames or more per second. However, this does not intend to limit the scope and spirit of the present disclosure, and the electronic device 600 may perform the method even in a preview mode in which video frames are displayed at the rate of thirty frames per second.

According to one embodiment, not when recording a video, but even when being in a photograph standby state of displaying image information acquired from the image sensor 610 on the display 630, the electronic device 600 may adjust a frame of the image information in accordance with a vertical synchronization signal of the display 630.

According to one embodiment, in a function of playing video contents, the electronic device 600 may adjust time information of at least a partial video frame included in the video contents in accordance with a vertical synchronization signal of the display 630. The video contents may be contents stored in a memory of the electronic device 600, or may be contents received from the outside of the electronic device 600. For example, the video contents may be streamed from an external server.

According to one embodiment, when the electronic device 600 moves, the electronic device 600 may adjust time information of a video frame in accordance with a vertical synchronization signal of the display 630. For example, when the electronic device 600 moves a specified distance or more while photographing a video, the electronic device 600 may adjust the time information of the video frame in accordance with the vertical synchronization signal of the display 630 and display the adjusted time information on a screen. For example, the electronic device 600 may determine a delay time of the time information of the video frame, on the basis of at least one of a distance by which the electronic device 600 has moved, a time, a speed of the movement and/or a direction of the movement.

According to one embodiment, the electronic device 600 may divide a screen into multiple regions and display different image information in each of the regions. For example, the electronic device 600 may apply a first adjustment (e.g., delay) time to the output timing of first image information (e.g., image) that will be displayed in one of the regions, and apply a second adjustment (e.g., delay) to the output timing, that is different from the first adjustment, of second image information (e.g., image) that will be displayed in another one of the regions. For example, the first image information may be information acquired from a first camera (e.g., front camera) of the electronic device 600, and the second image information may be information acquired from a second camera (e.g., rear camera) of the electronic device 600.

According to one embodiment, the electronic device 600 may acquire image information using two or more different cameras. For example, the electronic device 600 may generate a 3-Dimensional (3D) image using the image information acquired using the at least two cameras. For example, the electronic device 600 may determine an adjustment (e.g., delay) to the output timing of a first image information (e.g., image) acquired by one of the cameras, and apply the determined adjustment time to second image information (e.g., image) that is acquired by another one of the cameras.

A detailed description is made below for a more concrete example of a dynamic preview display method according to various embodiments of the present disclosure.

Figure 8:
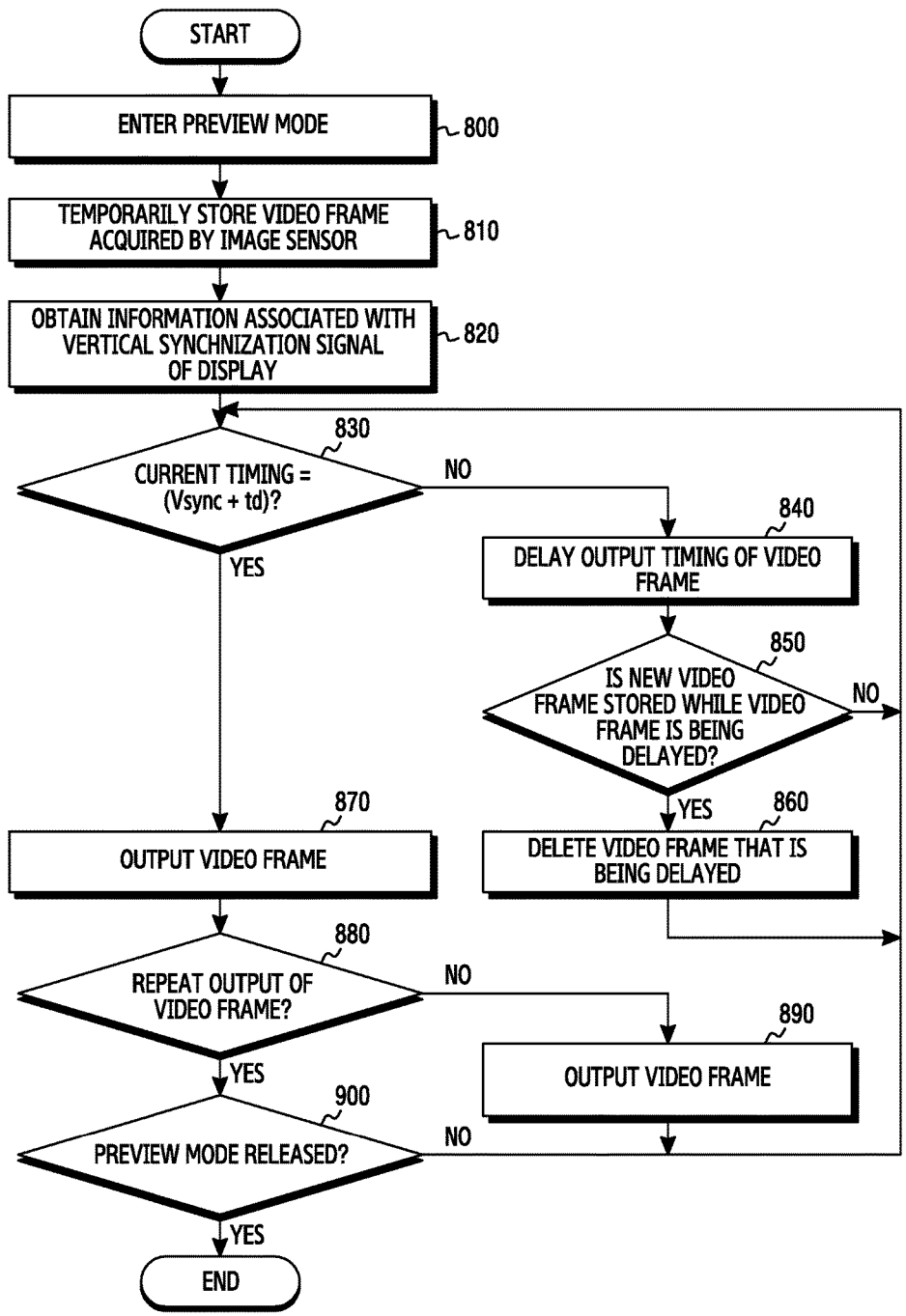
FIG. 8 is a flowchart of an example of a process, according to various embodiments of the present disclosure.

FIG. 8 is a flowchart of an example of a process, according to various embodiments of the present disclosure. According to the process, in operation 800, the application processor 620 of the electronic device 600 may enter a preview mode in which image frames are displayed in accordance with a vertical synchronization signal of the display 630. According to aspects of the disclosure, the preview mode may also be referred to as dynamic preview mode.

In operation 810, the application processor 620 may temporarily store a video frame acquired (e.g., captured in real-time) by the image sensor 610. In operation 820, the application processor 620 may obtain information associated with the vertical synchronization signal of the display. By way of example, the information may include an indication of the period at which the vertical synchronization is generated, and/or the timing of one or more vertical synchronization signals. As discussed further below, the application processor 620 may use the obtained information to adjust the output timing of a video frame to be transmitted to the display 630, based on the vertical synchronization signal of the display 630.

In operation 830, the application processor 620 may, for example, compare time information of the video frame, and time information of the vertical synchronization signal of the display 630 corresponding to the video frame. For example, the application processor 620 may determine whether the current output timing of the video frame is after predetermined time period (td) (e.g., td=1 ms) following the time when the vertical synchronization signal is generated.

When the current timing is not the previously set predetermined time (td) (e.g., td=1 ms) after the vertical synchronization signal is generated, in operation 840, the application processor 620 may perform an adjustment operation by delaying the output timing of the temporarily stored video frame.

In operation 850, the application processor 620 determines whether a new frame is stored while the display of the video frame is being delayed as a result of executing operation 840. In operation 860, the application processor 620 may delete the video frame that is being currently delayed and not display it at all.

When the current timing is the previously set predetermined time (td) (e.g., td=1 ms) after the vertical synchronization signal is generated, in operation 870, the application processor 620 may output the temporarily stored video frame to the display 630.

In operation 880, the application processor 620 may the output of the video frame should be repeated (e.g., maintained) after the next vertical synchronization signal is generated. For example, when there are no subsequent frames (e.g., frames captured after the current video frame) available for display, in operation 890, the application processor 620 may once again output the video frame outputted just before. In this manner, the video frame may be output during at least two subsequent vertical synchronization signal periods, each vertical synchronization period being the period between two subsequent vertical synchronization signals.

In operation 900, the application processor 620 may determine the release or non-release of the preview mode, and repeat or end the operations.

Figure 9:
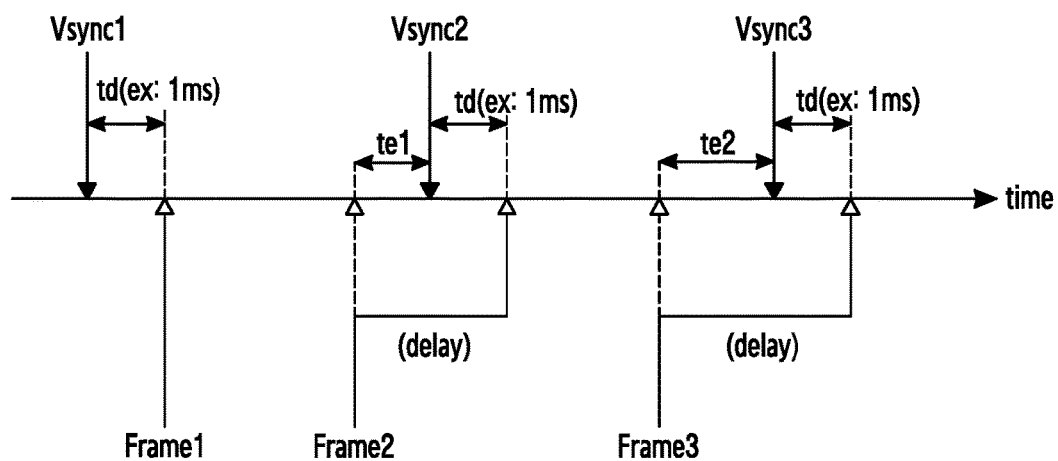
FIG. 9 is a timing diagram illustrating a technique for the display of image frames, according to various embodiments of the present disclosure.
Figure 10:
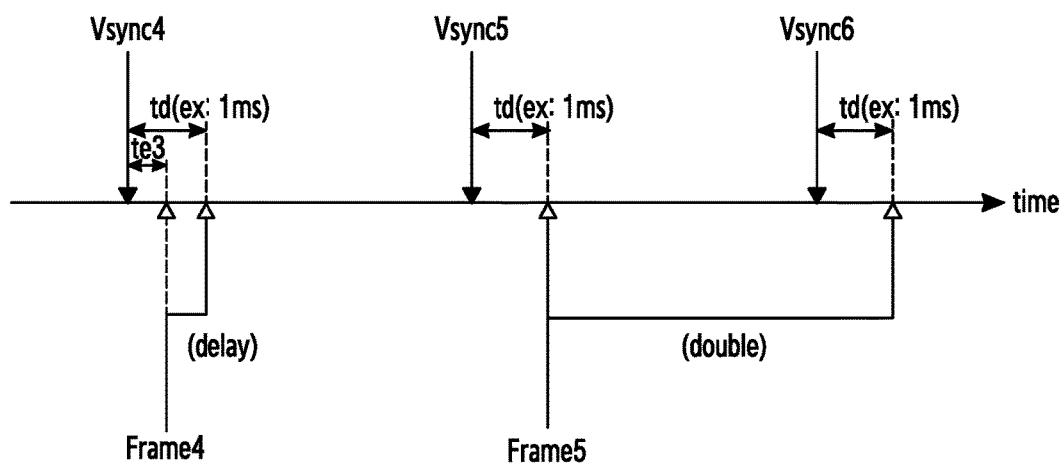
FIG. 10 is a timing diagram illustrating a technique for the display of image frames, according to various embodiments of the present disclosure.

FIGS. 9 and 10 are timing diagrams illustrating technique(s) for the display of image frames, according to various embodiments of the present disclosure.

Referring to FIG. 9, the application processor 620 may output, without delay, a first video frame (Frame1) at a previously set predetermined time (td), after a first vertical synchronization signal is generated. The application processor 620 may further delay a second video frame (Frame2)

during a first delay time (te1+td) and output the delayed second video frame at a previously set predetermined time (td), after a second synchronization signal (Vsync2) is generated. The application processor 620 may further delay a third video frame (Frame3) during a second delay time (te2+td) and output the delayed third video frame at a previously set predetermined time (td), after a third vertical synchronization signal (Vsync3) is generated.

Referring to FIG. 10, the application processor 620 may delay a fourth video frame (Frame 4) during a fourth delay time (td–te3) and output the delayed fourth video frame at a previously set predetermined time, after a fourth vertical synchronization signal (Vsync4) is generated. And, the application processor 620 may output, without delay, a fifth video frame (Frame 5) at a previously set predetermined time (td), after a fifth vertical synchronization signal (Vsync5) is generated.

Also, when there is no sixth video frame to be outputted to the display 630, the application processor 620 may again output the fifth video frame outputted just before, at a previously set predetermined time, after a sixth vertical synchronization signal (Vsync6) is generated.

Also, the application processor 620 may adjust the output timing of a video frame outputted to the display 630 based on a vertical synchronization signal of the display 630, thereby continuously displaying video frames without a drop.

Also, the application processor 620 adjusts the output timing of a video frame outputted to the display 630 based on a vertical synchronization signal of the display 630 and, when there is no video frame to be outputted, the application processor 620 may repeatedly instead output a video frame outputted just before, thereby continuously displaying video frames without a drop.

Also, the application processor 620 adjusts the output timing of the video frame outputted to the display 630 based on the vertical synchronization signal and, when a new video frame is photographed and temporarily stored in course of adjusting the output timing, the application processor 620 may delete the video frame that is being currently adjusted, thereby continuously displaying video frames without a drop and latency phenomenon.

According to various embodiments of the present disclosure, for example, an electronic device may adjust the output timing of a video frame outputted to a display based on a vertical synchronization signal of the display, thereby continuously displaying video frames without a drop.

According to various embodiments of the present disclosure, for example, in a preview mode of displaying on a display a video frame photographed by an image sensor, the electronic device may adjust the output timing of the video frame outputted to the display based on a vertical synchronization signal of the display and, when there is not a video frame to be outputted, the electronic device may repeatedly instead output the video frame outputted just before, thereby continuously displaying video frames without a drop.

According to various embodiments of the present disclosure, the electronic device may adjust the output timing of a video frame outputted to the display based on a vertical synchronization signal of the display and, when a new video frame is photographed and temporarily stored in course of adjusting the output timing, the electronic device may delete the video frame that is being currently adjusted, thereby continuously display video frames without a drop and latency phenomenon.

FIGS. 1-10 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A method for use in an electronic device, comprising:
    storing, in a memory of the electronic device, an image frame obtained via an image sensor based on a vertical synchronization signal of the image sensor;
    determining whether a predetermined time has elapsed after a first vertical synchronization signal of a display corresponding to the image frame is generated;
    in response to determining that the predetermined time has elapsed after the first vertical synchronization signal is generated, identifying the image frame from the memory; and
    displaying the image frame on the display.

2. The method of claim 1 wherein the image frame is displayed in a period between two subsequent vertical synchronization signals of the display.

3. The method of claim 1, further comprising displaying the image frame when the predetermined time has elapsed after a second vertical synchronization signal is generated without storing an additional image.

4. The method of claim 1, further comprising:
determining whether an additional image is stored before the predetermined time has elapsed;
in response to determining that the additional image is stored before the predetermined time has elapsed, deleting the image frame without displaying the image frame; and
when the predetermined time has elapsed, displaying the additional image on the display.

5. The method of claim 1, wherein, when the electronic device operates in a preview mode, updating information associated with the first vertical synchronization signal.

6. The method of claim 5, wherein:
the information includes an indication of at least one of a time and a period at which the first vertical synchronization signal is generated, and
the information is acquired from a driver of the display.

7. The method of claim 1, wherein a frame rate of the display is equal to or greater than a specified rate.

8. The method of claim 7, wherein the frame rate is sixty frames per second.

9. The method of claim 1, further comprising:
storing an additional image frame after the predetermined time has elapsed;
when a second vertical synchronization signal of the display is generated, determining whether the predetermined time has elapsed after the second vertical synchronization signal is generated; and
in response to determining that the predetermined time has elapsed after the second vertical synchronization signal is generated, displaying the additional image frame on the display.

10. An electronic device comprising:
a memory;
an image sensor;
a display; and
at least one processor operatively coupled to the memory, configured to:
store, in the memory, an image frame obtained through the image sensor based on a vertical synchronization signal of the image sensor;
determine whether a predetermined time has elapsed after a first vertical synchronization signal of the display corresponding to the image frame is generated;
in response to determining that the predetermined time has elapsed after the first vertical synchronization signal is generated, identify the image frame from the memory; and
control the display to the image frame on the display.

11. The electronic device of claim 10, wherein the image frame is displayed in a period between two subsequent vertical synchronization signals of the display.

12. The electronic device of claim 10, wherein
the at least one processor is further configured to display, via the display, the image frame when the predetermined time has elapsed after a second vertical synchronization signal is generated without storing an additional image.

13. The electronic device of claim 10, wherein the at least one processor is further configured to:
determine whether an additional image is stored before the predetermined time has elapsed;
in response to determining that the additional image is stored before the predetermined time has elapsed, delete the image frame from the memory without displaying the image frame; and
when the predetermined time has elapsed, display the additional image.

14. The electronic device of claim 10, wherein, when the electronic device operates in a preview mode, the at least one processor is further configured to update information associated with the first vertical synchronization signal.

15. The electronic device of claim 14, wherein:
the information includes an indication of at least one of a time and a period at which the first vertical synchronization signal is generated, and
the information is acquired from a driver of the display.

16. The electronic device of claim 10, wherein a frame rate of the display is equal to or greater than a specified rate.

17. The electronic device of claim 10, wherein the at least one processor is further configured to:
store an additional image frame after the predetermined time has elapsed;
when a second vertical synchronization signal of the display is generated, determine whether the predetermined time has elapsed after the second vertical synchronization signal is generated; and
in response to determining that the predetermined time has elapsed after the second vertical synchronization signal is generated, display the additional image frame on the display.

18. A non-transitory computer readable medium storing one or more processor-executable instructions, which when executed by at least one processor, cause the at least one processor to perform a process comprising the steps of:
storing, in a memory coupled to the one or more processor, an image frame obtained via an image sensor based on a vertical synchronization signal of the image sensor;
determining whether a predetermined time has elapsed after a vertical synchronization signal of a display corresponding to the image frame is generated;
in response to determining that the predetermined time has elapsed after the vertical synchronization signal is generated, identifying the image frame from the memory; and
displaying the image frame on the display.

* * * * *